United States Patent
Filipp

(10) Patent No.: US 6,702,534 B2
(45) Date of Patent: Mar. 9, 2004

(54) SPREADER DOWEL

(75) Inventor: Horst Filipp, Halle (DE)

(73) Assignee: Horst Filipp GmbH, Enger-Oldinghausen (DE)

( * ) Notice: Subject to any disclaimer, the term of this patent is extended or adjusted under 35 U.S.C. 154(b) by 0 days.

(21) Appl. No.: 10/085,881

(22) Filed: Feb. 27, 2002

(65) Prior Publication Data

US 2002/0127081 A1 Sep. 12, 2002

(30) Foreign Application Priority Data

Mar. 7, 2001 (DE) .......................... 101 10 921

(51) Int. Cl.⁷ ................................ F16B 13/06
(52) U.S. Cl. ..................... 411/58; 411/80.6; 411/32
(58) Field of Search ................ 411/24–26, 44–48, 411/54–56, 57.1, 58, 32, 60.2, 80.6

(56) References Cited

U.S. PATENT DOCUMENTS

| | | | | |
|---|---|---|---|---|
| 1,852,089 A | * | 4/1932 | Pleister et al. | 411/24 |
| 1,935,336 A | * | 11/1933 | Sluyter | 411/80.6 |
| 2,026,686 A | * | 1/1936 | Kirley | 411/80.6 |
| 2,379,786 A | * | 7/1945 | Bugg et al. | 411/80.6 |
| 3,874,264 A | * | 4/1975 | Polos | 411/80.6 |
| 4,114,654 A | * | 9/1978 | Richardson | 138/89 |
| 4,854,793 A | * | 8/1989 | Ollivier et al. | 411/49 |
| 5,391,023 A | * | 2/1995 | Basteck | 408/146 |
| 5,791,846 A | * | 8/1998 | Mayr | 411/54.1 |
| 6,287,044 B1 | * | 9/2001 | Huber | 403/297 |

FOREIGN PATENT DOCUMENTS

| | | | | |
|---|---|---|---|---|
| DE | 2 157 961 | | 5/1973 | |
| DE | 10012644 A1 | * | 9/2001 | E04B/1/38 |

* cited by examiner

Primary Examiner—Flemming Saether
Assistant Examiner—Jori Schiffman
(74) Attorney, Agent, or Firm—Henry M. Feiereisen

(57) ABSTRACT

A spreader dowel includes a sleeve having an area formed with an internal first thread for engagement by a screw. The sleeve has opposite ends and includes first longitude slots on one end for defining an expansion zone. A spreader piece formed with a conical portion is connected to the screw and spreads the expansion zone, when the screw is inserted. The sleeve has second longitude slots which extend inwardly from an end face on the other end. In the region of the second longitude slots toward the end face, the sleeve has a zone which is formed with an internal second thread defined by a thread diameter which is smaller than a thread diameter of the screw while having a same pitch as the thread diameter of the screw, or is threadless with a clear diameter which is smaller than an outer diameter of the screw.

24 Claims, 2 Drawing Sheets

SPREADER DOWEL

CROSS-REFERENCES TO RELATED APPLICATIONS

This application claims the priority of German Patent Application Serial No. 101 10 921.0, filed Mar. 7, 2001, the subject matter of which is incorporated herein by reference.

BACKGROUND OF THE INVENTION

The present invention relates, in general, to a spreader dowel, and more particularly to a dowel of a type having a sleeve formed with an internal thread for threaded engagement of a screw and having longitude slots on one end for providing an expansion zone which can be widened, when a spreader piece, connected to the screw and having a conical portion, is engaged therein.

It is to be understood by persons skilled in the art that the term "spreader dowel" is used in the following description in a generic sense and refers to any expansible fastener, which generally follows the concepts outlined here, including those connectors also referred to as "expansible anchors" or "expansible plugs".

Dowels of this type are widely used for many applications. For example, dowels can be used to secure fittings or the like in hollow sections. German publication DE-OS 2157961 describes a spreader dowel which has a sleeve provided with longitude slots in the outer surface area which faces the entry side for the screw, whereas the opposite end zone of the sleeve includes an internal thread. The screw is intended to extend through an object, such as a fitting, to be fastened and is formed integrally with a spreader piece with a conical prolongation. As the screw is tightened, the sleeve is forced against the hollow section wall, with the fitting resting on the other side thereof, while the segments, formed by the longitude slots, are spread at a same time by the inserted spreader piece. A clamping of the sleeve and support of the end face thereof by the section wall results in a fastening of the fitting in axial direction of the screw and spreader dowel.

This conventional spreader dowel suffers shortcomings because the spreader dowel is only able to absorb tensile forces. Bending forces that may be encountered cannot be absorbed by the spreader dowel. As a consequence, in particular when the fitting is an object such as a door handle or window handle and subject to strain during repeated use, the resultant changing loads lead ultimately to a loosening of the connection. Moreover, in those applications that involve the use of this conventional spreader dowel for fastening heavy objects, the holding capability of the spreader dowel is not exploited optimally because as a result of its construction only relatively small areas of the sleeve can be brought in contact with surrounding material. Also, problems have been encountered, when using the conventional spreader dowel to fasten objects such as fittings, as a result of the conjoint rotation of the sleeve with the screw, as the screw is tightened. The reason is the absence of any lateral holding of the sleeve, which is restrained only in the area of the end face where the screw is inserted. Naturally, this complicates installation and results in relatively high mounting costs.

It would therefore be desirable and advantageous to provide an improved spreader dowel which obviates prior art shortcomings and is easier to mount, while yet is able to withstand higher loads.

SUMMARY OF THE INVENTION

According to one aspect of the present invention, a spreader dowel includes a sleeve having an area, which is formed with an internal first thread for engagement by a screw, and including first longitude slots on one end for defining an expansion zone, and a spreader piece having a conical portion connected to the screw and widening the expansion zone, when the screw is inserted, wherein the sleeve has second longitude slots, extending inwardly from an end face on the other sleeve end, and includes in a region of the second longitude slots toward the end face a zone which is formed with an internal second thread defined by a thread diameter which is smaller than a thread diameter of the screw while having a same pitch as the thread of the screw, or, as an alternative, is threadless with a clear diameter which is smaller than an outer diameter of the screw.

A spreader dowel according to the present invention has many advantages. In conjunction with a fastening of an object, such as a fitting, to one wall of a hollow section, the screw can be tightened much easier because the sleeve of the spreader dowel can be inserted first and held by the second wall of the hollow section, i.e. the wall that is opposite the wall on the entry side for the screw, until the screw is guided by the object into the sleeve. The bore in the second wall of the hollow section has a diameter which corresponds to the diameter of the first wall. As it is received in the second section wall, the spreader dowel according to the present invention is supported twofold in conjunction with the inserted screw, thereby significantly improving the load-carrying capability. In addition, the novel and inventive spreader dowel is able to absorb bending forces so that the fastening strength of the attached object is significantly improved.

When mounting the spreader dowel, the area immediately confronting the engagement side is widened first so as to effect a press-fit against the surrounding wall. Thus, the spreader dowel is secured in axial direction and restrained from slipping. Only during further tightening of the screw does the spreader piece engage, thereby expanding the area of the first longitude slots and securing it in place through abutment against the surrounding wall.

According to another feature of the present invention, the first longitude slots and the second longitude slots are arranged in offset relationship. In this way, the longitude slots can be sized sufficiently long to overlap, thereby realizing a press-fit of the sleeve nearly over the entire length thereof, especially when the spreader dowel is inserted in a bore that fully surrounds the sleeve. As a consequence, the pressure force is increased by a multiple compared to prior art spreader dowels of the so-called heavy-duty type, so that the load-carrying capability is also enhanced.

According to another feature of the present invention, a threaded zone is provided to immediately follow the area of the internal first thread with same nominal diameter as the screw toward the free end, i.e. the end distal to the engagement side, whereby the threaded zone has a nominal diameter which is smaller than the nominal diameter of the screw so that the expansion is realized only when the screw is engaged in this zone. Hereby, the nominal diameter of the threaded zone may correspond to the minor diameter of the screw thread.

The manufacturing process of the spreader dowel according to the present invention may be further simplified, when the zone following the area of the internal first thread is smooth and thus threadless, whereby the clear diameter of the zone is slightly smaller than the outer diameter of the screw or the nominal diameter of the thread. Suitably, the clear diameter of the smooth zone corresponds to the minor diameter of the thread.

According to another feature of the present invention, the spreader piece is held non-rotatably in the sleeve. This can be realized by providing the spreader piece with a nose for engagement in a complementary recess of the sleeve or in one of the first longitude slots.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
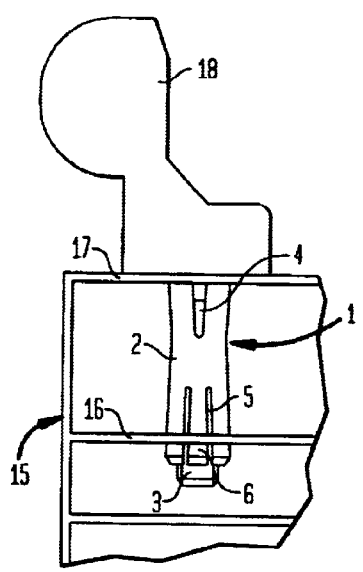
FIG. 1 is a schematic illustration of a spreader dowel according to the present invention in mounted position for fastening an object.

Throughout all the Figures, same or corresponding elements are generally indicated by same reference numerals.

Turning now to the drawing, and in particular to FIG. 1, there is shown a schematic illustration of a spreader dowel according to the present invention, generally designated by reference numeral 1 and used, for example, for fastening an object 18, such as a fitting, against a structure such as a hollow section 15. The spreader dowel 1 includes a sleeve 2 and a bolt or screw 3 insertable into the sleeve 2 on one side. For sake of simplicity, the following description refers only to "screw", although it is to be understood that the terms "bolt" and "screw" are interchangeable.

Figure 2:
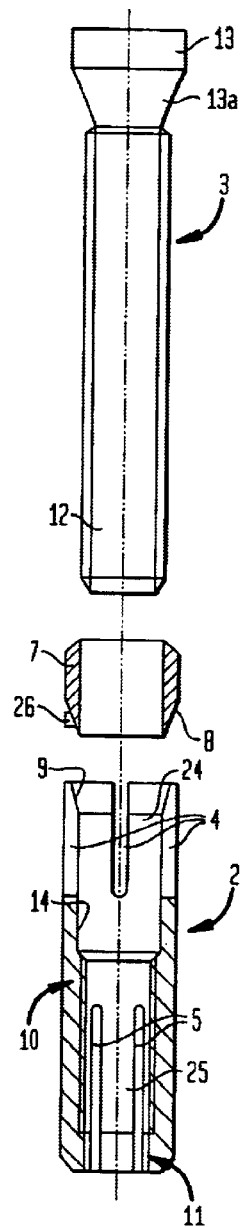
FIG. 2 is a partially sectional illustration, in exploded view, of the spreader dowel of FIG. 1.

As shown in FIG. 2, which is a partially sectional illustration, in exploded view, of the spreader dowel 1, the sleeve 2 is formed with an internal thread 10 which extends inwardly from the screw-entry distal end face over a portion of the sleeve 2 and provided for threaded engagement by the screw 3. The internal thread 10 has a nominal diameter which corresponds to the nominal diameter of the thread of the screw 3.

The sleeve 2 has a length which is longer than a clearance between two spaced-apart walls 16, 17 of the hollow section 15. In addition to the internal thread 10, the sleeve 2 is formed with axial longitude slots 4 which extend inwardly from the screw entry side in parallel spaced-apart relationship to define resilient segments 24. In the exemplified embodiment shown here, the longitude slots 4 are arranged solely within a threadless zone 14 of the sleeve 2, which zone 14 extends from the screw entry side to the internal thread 10.

Figure 4:
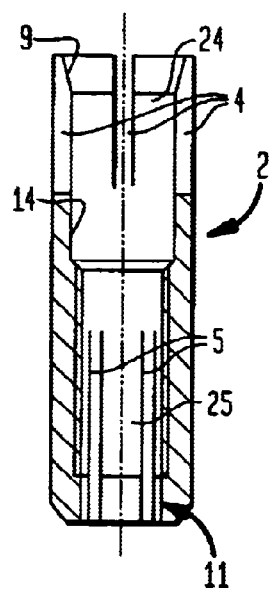
FIG. 4 is a longitudinal section of a modified spreader dowel in mounted position and FIG. 5 is a partially sectional illustration, in exploded view, of a modification of the spreader dowel of FIG. 1.

Extending axially inwardly from the screw entry distal side of the sleeve 2 are parallel spaced apart longitude slots 5 which are disposed in offset relationship to the longitude slots 4 and define resilient segments 25. Suitably, the longitude slots 5 are offset to the longitude slots 4 at an angle of 45° and there are provided four longitude slots 4 as well as four longitude slots 5. As a result, the longitude slots 4, 5 can be sized sufficiently long to overlap, thereby realizing a press-fit of the sleeve nearly over the entire length thereof, as shown in FIG. 4.

As shown in FIG. 2, the internal thread 10 terminates proximal a further threadless zone 11 on its side distal to the threadless zone 14. Whereas the threadless zone 14 has a diameter which is greater than the diameter of the screw 13, the threadless zone 11 has a diameter which is smaller than the diameter of the screw 3 at corresponding tread pitch. Suitably, the diameter of the threadless zone 11 corresponds to the minor diameter of the screw 3.

Figure 5:
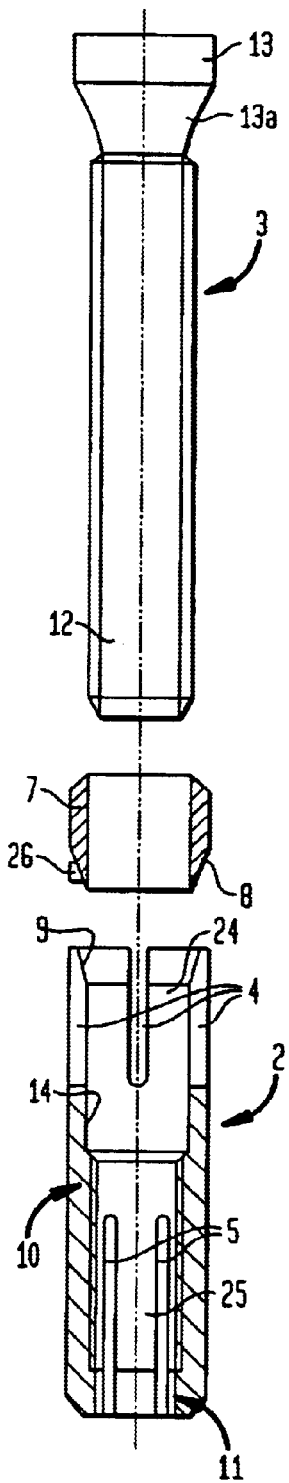

Instead of being threadless, according to an alternative embodiment, shown in FIG. 5, the zone 11 may also be formed with an internal thread defined by a diameter which is smaller than the diameter of the screw 3. Suitably, the nominal diameter of the internal thread in the zone 11 corresponds to the core diameter of the screw 3.

The screw 3 has a head 13 at one end and a shank 12 extending from the head 13. A spreader piece 7 is attachable to the screw 3 for axial displacement along the shank 12 and has a sleeve-like configuration. At its side facing the sleeve 2, the spreader piece 7 has a conical portion 8 and is forced into engagement with the sleeve 2 via the head 13 of the screw 3. The spreader piece 7 is suitably formed with a restraining mechanism for holding the spreader piece 7 non-rotatably in the sleeve 2. As shown by way of example in FIGS. 2 and 3, the restraining mechanism includes a nose 26 which is formed on the spreader piece 7 and intended to engage one of the first longitude slots 4. As an alternative, it is, of course, also conceivable to engage the nose 26 in a separate recess.

Figure 3:
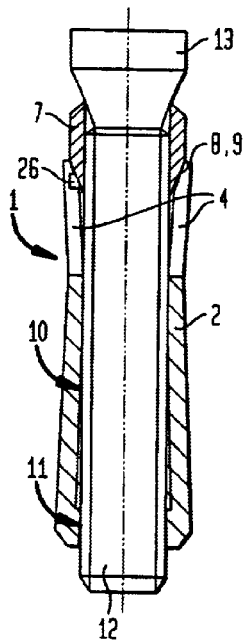
FIG. 3 is a longitudinal section of the spreader dowel in mounted position.

When the screw 3 is inserted in the sleeve 2 and tightened so as to engage the internal thread 10 of the sleeve 2, the conical portion 8 of the spreader piece 7 is received in a confronting complementary inner conical portion 9 which flares outwards toward the screw-entry side of the sleeve 2. As the screw 3 is further tightened, its screw end advances past the internal thread 10 and enters the threadless zone 11 to thereby spread the segments 25 against the intrados of a throughbore in the wall 16 of the hollow section 15 (see FIGS. 1 and 3). During further advance of the screw 3, the spreader piece 7 is forced with its conical portion against the inner conical portion 9 of the sleeve 2 to thereby spread the segments 24, as shown in FIG. 3. As a result, the proximal end face (screw entry side) of the sleeve 2 rests against the confronting side of the wall 17 of the hollow section 15 and thereby anchors the object 18 in axial direction.

In order to enhance an anchoring of the sleeve 2, in particular as the screw 3 is tightened initially, the sleeve 2 has a knurling 6 (FIG. 1) in the area of the longitude slots 5 for abutment against the intrados of the bore in the wall 16.

While the invention has been illustrated and described as embodied in a spreader dowel, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated. For example, it is certainly within the scope of the present invention, to shape the screw 3 in a manner as to eliminate the need for a separate spreader piece 7. This can be realized, e.g., by providing the screw 3 with a conical portion 13a for engagement in the inner conical portion 9 of the sleeve 2.

What is claimed as new and desired to be protected by Letters Patent is set forth in the appended claims and their equivalents:

1. A spreader dowel, comprising:
a sleeve having a cylindrical configuration continuously from end-to-end and including an area formed with an internal first thread portion for engagement by a screw having a head-distal end and a head-proximal end and provided with a continuous thread from the head-proximal end to the head-distal end,
said sleeve having opposite ends and including first longitudinal slots on one of the ends for defining an expansion zone and second longitude slots extending inwardly from an end face on the other end, said sleeve having in a region of the second longitude slots toward the end face a zone which is formed with an internal second thread with a thread diameter which is smaller than a thread diameter of the screw while having a same pitch as the thread diameter of the screw, the internal second thread portion being cylindrical; and
a spreader piece having a conical portion connected to the screw and widening the expansion zone, when the screw is inserted.

2. The spreader dowel of claim 1, wherein the internal second thread portion of the zone has a nominal diameter which corresponds to a minor diameter of the screw.

3. The spreader dowel of claim 1, wherein the zone is disposed immediately following the internal first thread.

4. The spreader dowel of claim 1, wherein the second longitude slots extend into the area of the internal thread portion.

5. The spreader dowel of claim 1, wherein the first longitude slots and the second longitude slots are arranged in offset relationship.

6. The spreader dowel of claim 5, wherein the first longitude slots are offset to the second longitude slots at an angle of 45°.

7. The spreader dowel of claim 5, wherein the first longitude slots and the second longitude slots are arranged in overlapping relationship.

8. The spreader dowel of claim 1, wherein there are provided four of said first longitude slots and four of said second longitude slots.

9. The spreader dowel of claim 1, wherein the spreader piece is a member separate from the screw.

10. The spreader dowel of claim 1, wherein the spreader piece has restraining means for holding the spreader piece non-rotatably in the sleeve.

11. The spreader dowel of claim 10, wherein the restraining means includes a nose for engagement in one of a recess of the sleeve and one of the first longitude slots.

12. A spreader dowel for retaining an object against a structure, comprising a sleeve having a cylindrical configuration continuously from end-to-end and defined by a longitudinal axis and having a first end, a second end, a first threadless section formed with first axial slots to define resilient segments for engagement against a surrounding wall of the structure, a second section formed with an internal thread for threaded engagement by a screw and being of cylindrical configuration, said screw having a head-distal end and a head-proximal end and is provided with a continuous thread from the head-proximal end to the head-distal end, and a third section, wherein the first section extends inwardly from the first end of the sleeve and terminates proximal the second section, wherein the second section terminates proximal the third section, wherein the third section extends to the second end, wherein the sleeve includes second axial slots extending inwardly from the second end to define resilient segments for engagement against the wall of the structure.

13. The spreader dowel of claim 12, wherein the third section is formed with an internal thread defined by a thread diameter which is smaller than a thread diameter of the screw while having a same pitch as the thread diameter of the screw.

14. The spreader dowel of claim 12, wherein the third section is threadless and defined by a clear diameter which is smaller than an outer diameter of the screw.

15. The spreader dowel of claim 12, wherein the first end is flared outwards.

16. The spreader dowel of claim 15, and further comprising a spreader piece, connected to the screw, for engagement in the first section to spread the segments against the wall of the structure, wherein the spreader piece has a conical portion for interaction with the first end.

17. The spreader dowel of claim 16, wherein the screw has a conical portion to act as the spreader piece.

18. The spreader dowel of claim 12, wherein the second axial slots extend from the second end inwardly into an area of the second section.

19. The spreader dowel of claim 12, wherein the first axial slots and the second axial slots are arranged in offset relationship.

20. The spreader dowel of claim 19, wherein the first axial slots are offset to the second axial slots at an angle of 45°.

21. The spreader dowel of claim 19, wherein the first axial slots and the second axial slots are arranged in overlapping relationship.

22. The spreader dowel of claim 12, wherein the spreader piece has restraining means for holding the spreader piece non-rotatably in the sleeve.

23. A spreader dowel, comprising:
a sleeve having a cylindrical configuration continuously from end-to-end and including an area formed with an internal first thread portion for engagement by a screw having a head-distal end and a head-proximal end and provided with a continuous thread from the head-proximal end to the head-distal end,
said sleeve having opposite ends and including first longitude slots on one of the ends for defining an expansion zone and second longitude slots extending inwardly from an end face on the other end, said sleeve having in a region of the second longitude slots toward the end face a zone which is formed with a threadless zone of a clear diameter which is smaller than an outer diameter of the screw, the threadless portion being cylindrical; and
a spreader piece having a conical portion connected to the screw and widening the expansion zone, when the screw is inserted.

24. The spreader dowel of claim 23, wherein the threadless zone has a clear diameter which corresponds to minor diameter of the screw.

* * * * *